United States Patent

Sherman et al.

[15] 3,671,458
[45] June 20, 1972

[54] MIXTURES OF FATTY ETHERS OF POLYHYDRIC ALCOHOLS AND THEIR ANHYDRIDES AND PROCESS FOR PRODUCING SAID MIXTURES

[72] Inventors: Albert H. Sherman, New Castle; John D. Zech, Wilmington, both of Del.

[73] Assignee: Atlas Chemical Industries, Inc., Wilmington, Del.

[22] Filed: Sept. 17, 1969

[21] Appl. No.: 858,881

[52] U.S. Cl. ............................. 252/351, 252/312, 252/358, 252/DIG. 1, 260/209 R, 260/233.3 R, 260/345.9, 260/347.2, 260/347.8, 260/613 B, 260/613 D, 260/615 B
[51] Int. Cl. .................................... B01f 17/32, B01f 17/42
[58] Field of Search ................................... 252/351, DIG. 1

[56] References Cited

UNITED STATES PATENTS

| | | | |
|---|---|---|---|
| 2,322,820 | 6/1943 | Brown | 252/356 X |
| 3,031,510 | 4/1962 | Crecelius | 252/351 X |
| 3,317,508 | 5/1967 | Winquist, Jr. et al. | 260/615 X |
| 3,427,248 | 2/1969 | Lamberti et al. | 252/135 X |

*Primary Examiner*—Richard D. Lovering
*Attorney*—Kenneth E. Mulford and Roger R. Horton

[57] ABSTRACT

Ether compositions of fatty epoxides and polyhydric alcohols and a process for preparing said ethers are disclosed. These ether compositions are represented by the general formula:

$$[R - X - R_2 - O]_y - R_3 \qquad (1)$$

where R is an alkyl, alkenyl, alkaryl or alkenaryl radical; X is either S, O or a methylene radical. $R_2$ is selected from the group consisting of radicals of the following formulae:

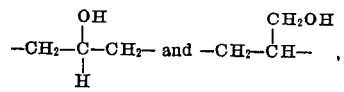

$y$ is a number from 1 to 4, and $R_3$ is a radical remaining after $y$ hydroxyl groups are removed from an anhydrized polyhydric alcohol; and mixtures of compounds within formula (1) with compounds represented by the general formula $$[R - X - R_2 - O]_y - R_1$$

wherein R, X, $R_2$ and $y$ are as defined above and $R_1$ is a radical formed when $y$ hydroxyl groups are removed from a polyhydric alcohol. The ether compositions are excellent surfactant compositions, being useful as antifoaming agents, emulsifiers and dispersants, and they are more resistant to acid and alkali solutions than organic ester type surfactants heretofore used.

10 Claims, No Drawings

MIXTURES OF FATTY ETHERS OF POLYHYDRIC ALCOHOLS AND THEIR ANHYDRIDES AND PROCESS FOR PRODUCING SAID MIXTURES

This invention concerns novel ether compositions and a process for producing same. More particularly, this invention concerns ethers of lipophilic epoxides, and polyhydric alcohols and their anhydrides and a process for producing same.

It is an object of this invention to provide novel ether compounds.

It is another object of this invention to provide a process for the preparation of said ethers.

It is also an object of this invention to provide new surfactant compositions which are acid and alkali stable.

Still further objects will become apparent to those skilled in the art from the following detailed description of said invention.

The novel ether compositions of this invention may be represented by the formula (1) $[R - X - R_2 - O]_y - R_3$, and mixtures of same with compounds represented by formula (2) $[R - X - R_2 - O]_y - R_1$, wherein R is an alkyl, alkenyl, alkaryl, or alkenaryl radical; X is either oxygen, sulfur or a methylene radical, $R_2$ is selected from a group of radicals represented by the formulas:

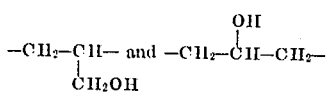

y is a number from 1 to 4, $R_3$ is a radical remaining when y hydroxyl groups are removed from an anhydrized polyhydric alcohol, said anhydrized polyhydric alcohol containing at least 1 hydroxyl group and at least four carbon atoms, $R_1$ is a radical remaining when y hydroxyl groups are removed from a polyhydric alcohol which contains at least three hydroxyl groups and at least three carbon atoms, said mixtures contain at least 10 weight percent of compound within formula (1), and contain no more than 10 weight percent of three carbon atom alcohols.

More particularly, the compounds of this invention, as represented by formula (1) above, will have an alkyl or alkenyl radical comprising a combination of R, X and $R_2$ which is at least about eight carbon atoms long. Thus where R is an alkaryl or alkenaryl radical the alkyl or alkenyl moiety of said radicals contain a saturated or ethylenically unsaturated aliphatic hydrocarbon chain of at least eight carbon atoms.

Exemplary of the R radicals are the following: dodecyl, octyl, octenyl, nonylphenyl, nonenylphenyl, octadecyl, docosyl, docosenyl, octadecylphenyl, eicosyl, decyl, tetradecyl, octylphenyl, and docosenyl phenyl.

In a preferred class of R radicals, the total alkyl or alkenyl chain would be from about 10 to about 25 carbon atoms such as dodecyl and octadecylphenyl.

Said anhydrized polyhydric alcohols are anhydrized alkanetriols, alkanetetrols, alkanepentols, hexitols, and oxyalkylene substituted anhydrized polyhydric alcohols of the above classes, wherein the oxyalkylene content is from one to 30 mols per mol of said anhydrized polyhydric alcohol.

Examples of the above anhydrized polyhydric alcohols include erythritan, threitan, xylitan, sorbitan, mannitan, iditan, isosorbide, 2,5-bis(hydroxymethyl) tetrahydrofuran, polyoxyethylene(10)dulcitan, polyoxyethylene(20)xylitan, polyoxypropylene(6)sorbitan, and polyoxyethylene(3)isosorbide.

Said polyhydric alcohols are selected from alkanetetrols, alkanetriols, alkanepentols, hexitols, hexitans, pentitans, and mixtures thereof, and oxyalkylene substituted polyhydric alcohols of the above classes wherein the oxyalkylene content is from one to 30 mols per mol of said polyhydric alcohol.

Examples of these polyhydric alcohols include: glycerine, 1,2,3-butanetriol, erythritol, xylitol, sorbitol, 1,2,5,6-hexanetetrol, threitol, 1,2,4-butanetriol, 1,2,5-pentanetriol, polyoxyethylene(2)mannitol, polyoxypropylene(10)xylitol.

A preferred class of said polyhydric alcohols and said anhydrized polyhydric alcohols contains at most about ten carbon atoms.

The classes of compounds within formula (1) include 2-hydroxyalkyl ethers of said anhydrized polyhydric alcohols; 1-hydroxymethyl alkyl ethers of said anhydrized polyhydric alcohols; 2-hydroxyalkenyl and 1-hydroxymethylalkenylethers of said anhydrized polyhydric alcohols; alkylphenyloxyhydroxypropyl and alkenylphenyloxyhydroxypropyl ethers of said anhydrized polyhydric alcohols; alkyloxyhydroxypropyl, alkenyloxyhydroxypropyl, and alkylthiohydroxypropyl, alkenylthiohydroxypropyl, alkylphenylthiohydroxypropyl and alkenylphenylthiohydroxypropyl ethers of said anhydrized polyhydric alcohols.

Some specific examples of such compounds include: 2-hydroxydodecyl ether of 1,4-sorbitan; (1-hydroxymethyl) heptadecenyl ether of polyoxyethylene(10)xylitan; 2 hydroxy dodecyl ether of A-Polyol anhydride [A-Polyols are particular mixtures of polyhydric alcohols the preparation of which are described in Examples A—E, infra,]; octyloxyhydroxypropyl ether of mannitan; decenyloxyhydroxypropyl ether of isosorbide; dodecyloxyhydroxypropyl ether of isomannide; docosyl phenyloxyhydroxypropyl ether of A-Polyol; octylthio(hydroxypropyl) ether of sorbitan, docosenylthio(hydroxypropyl) ether of polyoxyethyl(10)mannitan; nonylphenylthio(hydroxypropyl) ether of polyoxyethylene(25)isosorbide; di(dodecyloxyhydroxypropyl) ether of xylitan, tetra(nonylphenylthio[hydroxypropyl]) ether of sorbitan; and other compounds within the classes encompassed by formula (1).

Classes of compounds within formula (2) above include those listed above for formula (1) wherein they are ethers of non-anhydrized polyhydric alcohols. Specific examples include 2-hydroxy nonyl ether of threitol, dodecylthiohydroxypropyl ether, and 2-hydroxydodecenyl ether of sucrose A-polyol.

A preferred group of ether compositions within formulas (1) and (2) are ethers of A-Polyol and mixture of compositions within formulas (1) and (2). Examples of the compounds within the above preferred class include β-hydroxydocosenyl ether of sucrose A-Polyol anhydride, nonylphenyl ether of cornstarch A-Polyol anhydride; decyloxyhydroxypropyl ether of xylose A-Polyol anhydride; nonylthiohydroxypropyl ether of sucrose A-Polyol anhydride; dodecyl ether of glucose A-Polyol, an 80–20 weight percent mixture of β-hydroxydodecyl ether of sorbitan and nonylthiohydroxypropyl ether of threitol, and a 90–10 weight percent mixture of nonylphenyl oxy(hydroxypropyl) ether of mannitol and γhydroxymethylpentadecyl ether of sorbitan.

The novel compounds of this invention may be made by reacting an epoxide, represented by the formula (3) $R - X - R_4$, with said polyhydric alcohol or said anhydrized polyhydric alcohol in the presence of a catalyst, and a solvent, at temperatures of about 60° to about 200° C., and in a mol ratio of epoxide to alcohol from about one to one and up to about four to one. In formula (3) above R and X are as defined in formula (1) and $R_4$ is an oxyranylmethyl radical. The epoxide contains an alkyl or alkenyl chain of at least eight carbon atoms. Illustrative of these epoxides are the following commercially available compounds — Nedox 1114 — a mixture of terminal olefin oxides whose chain length varies from 11–14 carbon atoms, Nedox 1518 — a mixture of terminal olefin oxides of carbon chain length of 15–18, stearylglycidylether, cetylglycidylether, laurylglycidylether, and nonylphenylglycidylether.

The mechanism of this reaction is a normal epoxide addition reaction. Therefore, if an epoxide of formula (3) is reacted with a hexitol anhydride, one could write the reaction as:

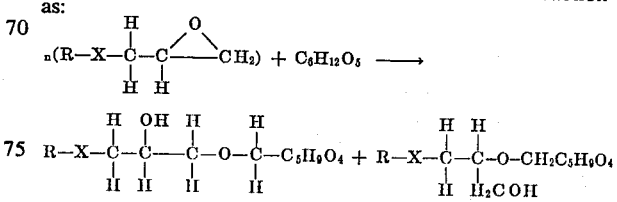

In the above formulas the reaction product illustrates the two products which may result when the epoxide ring opens; n is the number of mols of epoxide per mol of alcohol.

During the course of the reaction the temperature is not a critical variable. When the temperature is within the range enumerated above, 60° to about 200° C., the reaction will proceed; however, the greater the temperature the faster the reaction should proceed. At temperatures below 60° C. the reaction will proceed too slowly to be practical. When the temperature exceeds 200° C. there is a possibility of some product or reactant degradation. A preferred temperature is from about 80° to about 120° C.

The catalysts which may be used in this reaction are the usual epoxide catalysts. These include both the acidic catalysts such as Lewis acids, and the basic catalysts such as alkali metals, their hydroxides, and basic salts, amines, and alkali alkoxides. Examples of these catalysts are: boron trifluoride, boron trifluoride etherate or the phenol or acetic acid complex thereof, sulfuric acid, p-toluenesulfonic acid, perchloric acid, aluminum trichloride, ferric chloride, fluosulfonic acid; stannic chloride, sodium, lithium, calcium and their alkoxides, triethylamine, sodium acetate, and acid clays. The usual concentration of these catalyst is from 0.01 to about 5.0 weight percent of the reactants, depending upon the catalyst. A more preferred range of catalyst concentration is 0.10 to 1.0 weight percent. A preferred class of catalysts is $BF_3$ NaOH and LiOH.

Naturally the temperatures and catalyst concentration are interdependent and the higher the catalyst concentration the more rapid the reaction at a given temperature or the higher the temperature the less catalyst is needed.

To successfully run the subject reactions it has been found that a mutual solvent is almost always needed because of the incompatability of the hydrophilic polyhydric alcohols and the hydrophobic epoxide. In certain instances, however, where the hydrophilicity of the alcohol is not too great, such as with isosorbide, the epoxide will dissolve in same, and thus it acts as its own solvent. In this case, however, at least a 1 mol excess of polyol will be required to insure a homogeneous solution. Solvents which have been used include dioxane, diglyme, methyl ethyl ketone, pyridine and dimethyl formamide. Basic catalyst can be utilized in all of these solvents, however, the acid catalysts cannot be used where the solvent is an amine or a derivative of same, thus pyridine and dimethylformamide should only be used with basic catalysts. The preferred solvents for this reaction are dioxane and diglyme.

A preferred mixture of polyhydric alcohols used in this reaction is a distillation fraction of a hydrogenolysis reaction product as described in U. S. Pat. No. 3,278,398. In said patent the preferred polyol mixture is a particular fraction labelled "second-subfraction" on the schematic flow sheet, and it is also identified as the bottoms fraction of a distillation column called the Tetritol Column. This distillation fraction is generically called "A-Polyol" for the purposes of this disclosure. A-Polyol is an intimate mixture of polyols boiling at or around the boiling point of glycerine and at temperatures higher than glycerine. The A-Polyol will vary slightly in composition depending upon the starch or sugar or combination of same used in the hydrogenolysis process. Thus when inverted sucrose, a 50/50 mixture of fructose and glucose, undergoes hydrogenolysis and the product is fractionated by the above patents distillation scheme, the tetritol columns bottoms stream will contain polyols ranging from glycerine up through the various isomers of hexitol and include some recombination products of the monosacharrides present in the feed. This product is A-Polyol of hydrogenolytic invert sugar. In all A-Polyols the quantity of glycerin is maintained at levels below 10 weight percent of the A-Polyol composition and in most instances the glycerin content will not be more than 2 weight percent.

To illustrate the preparation of A-Polyols, the following examples are presented:

EXAMPLE A

A 60 weight percent water solution of invert sugar, in the presence of 2.0 weight percent of a supported nickel catalyst and 1.0 weight percent of calcium carbonate is heated in an autoclave at 2,000 psia and 220° C. and reacted with hydrogen for 2 hours.

The catalyst and other insoluble salts are filtered from the reaction product and the filtrate is distilled to remove essentially all water at temperatures of up to 230° C. and at pressures slightly higher than atmospheric. The distillation column bottom stream is then further fractionated in a second column at a still temperature of 230° C., with the top of the column maintained at 100 mm of Hg absolute. All columns used in this example are bubble tray distillation columns.

The bottoms product of the second column contains polyols which boil at temperature around or higher than the boiling point of glycerin. This second column bottoms is introduced as feed in a third column (The Tetritol Column heretofore mentioned) which is maintained at a top pressure of 100 mm Hg absolute while the bottom temperature is maintained at 230° C. The reflux rate and vapor rate are maintained so that the bottom stream of said tetritol column contain at most 2 percent glycerin.

This bottom stream is within the catagory of polyols called A-Polyols for purposes of this disclosure.

EXAMPLE B

A polyol within the class of A-Polyols is prepared by fractional distillation per Example A of a hydrogenolytic product of corn starch hydrolyzate.

EXAMPLE C

A polyol within the class of A-Polyols is prepared per Example A by fractional distillation of a hydrogenolytic product of wood sugar.

A preferred mixture of polyhydric alcohol anhydrides is an anhydrized A-polyol. That is an A-polyol as defined above is anhydrized under either acid or basic conditions until up to about 2 mols of water are removed per mol of A polyol. The anhydrization of said A polyol may be performed using an acid or alkali catalyst such as mineral acids and their acid salts, and alkali metal earths, their hydroxides, oxides and basic salts. Examples of such catalysts are $H_2SO_4$, $H_3PO_4$, HCl, NaOH, $Ca(OH)_2$, KOH, $NaOOC_3H_5$ and LiOH. This anhydrization is made notwithstanding the fact that all A-polyols contain anhydrized polyhydric alcohols.

To illustrate the preparation of these anhydrized A-polyols, the following non-limiting examples are present:

EXAMPLE D 200 grams of the A polyol prepared according to Example A are heated to 100° C. and stirred to create a homogeneous mass. To said A polyol is added 3 ml. of 50 percent (weight volume) aqueous sodium hydroxide. This mixture is then heated to 225° C. at which point water and the volatiles are given off. The heating of said mixture is continued until 260° C. at which point 6 weight percent of the original mixture has been volatilized of which 92 percent is water or about 0.5 mols of water per mol of polyol. This anhydrized product is then cooled to room temperature.

EXAMPLE E

Per Example D the A polyol prepared in Example B is heated to 100° C. and 6 ml of 50 weight percent sulfuric acid is added. The mixture is heated to 160° C. and maintained at this temperature until 20 weight percent volatiles of which 90 percent is water, is flashed. The water equals about 1.6 moles of water removed per mol of A-Polyol.

Since many of the epoxides used in producing the ethers of this invention are not particularly common, the following representative examples are given to illustrate their preparation.

EXAMPLE F 242 grams (1 mol) of hexadecyl alcohol is heated to about 70° C. and 2 ml of an ether solution of $BF_3$ (45 weight percent $BF_3$) is added. To this one adds dropwise 93 grams (1 mol) of epichlorohydrin while maintaining the temperature at 70° to 90° C. This mixture is stirred for an additional hour within the 80° to 90° C. temperature span and then diluted with 500 ml of dioxane and 164 grams of sodium aluminate. This mixture is refluxed for about 8 hours and then filtered. The filtrate is a dioxane solution of hexadecyl glycidyl ether.

EXAMPLE G

Per the procedure of Example F, 202 grams of tridecyl alcohol, in the presence of 2 ml of 45 weight percent ether solution of $BF_3$, is mixed with epichlorohydrin and then heated at 80°–90° C. for 1 hour. This mixture is then diluted with 50 ml of dioxane and 164 grams of sodium aluminate. This solution is reacted for about 8 hours at its reflux temperature. The product is a tridecyl glycidyl ether.

EXAMPLE H

A mixture of 202 grams of 1-dodecanethiol and 102 grams of epichlorohydrin is heated to about 80° C. To this, over a period of one hour and while maintaining the temperature at about 90°–110° C., is added 40 grams of powdered sodium hydroxide. This mixture is then vacuum stripped to remove any volatiles formed. This mixture is then cooled and dissolved in 500 ml of benzene and filtered to remove any salts present. The benzene is then stripped to leave the dodecyl glycidyl thioether.

EXAMPLE I

A solution of 268 grams of oleyl alcohol in 50 ml of dioxane is heated to about 70° C. 2 ml of a 45 weight percent $BF_3$ ether solution are added to the oleyl and then while maintaining the oleyl solution at 70°–90° C. 93 grams of epichlorohydrin are added. After the addition is completed the mixture is stirred at 80°–90 C. for an hour. Then 164 grams of sodium aluminate is added in portions and the mixture stirred at 80°–90° C. for an additional 8 hours. Upon filtering the solids from the mixture the filtrate is a solution of oleyl glycidyl ether in dioxane.

EXAMPLE J

Per the procedure of Example H, 148 grams of 1-octanethiol is reacted with 102 grams of epichlorohydrin. The resultant product is octyl glycidyl thioether.

To better illustrate the process of this invention and to enable those skilled in the art to practice the subject invention the following non-limiting examples of the preparation of the ethers of said invention are presented.

EXAMPLE 1

To a solution of 10 grams of sucrose, A-Polyol anhydride of Example E and 4 ml of boron trifluoride etherate in 200 ml of dioxane is added 1 mol of the hexadecyl glycidyl ether as a dioxane solution prepared in Example F while maintaining the temperature at 95°–100° C. After the addition is completed the mixture is refluxed for two hours. The product is vacuum stripped to remove the dioxane solvent and yields a hexadecyloxy-hydroxypropyl ether of sucrose A-Polyol anhydride.

EXAMPLE 2

Per the procedure of Example 1, 100 grams of the A-Polyol anhydride prepared in Example E are reacted with 1 mol of oleyl glycidyl ether in a dioxane solvent to yield the oleyloxyhydroxypropyl ether of said anhydrized A-Polyol.

EXAMPLE 3

Per the procedure of Example 1, 100 grams of the A-Polyol anhydride prepared in Example E is reacted with 1 mol of dodecyl glycidyl thioether to yield the dodecylthiohydroxypropyl ether of said A-Polyol anhydride.

EXAMPLE 4

164 grams of sorbitan and 3.4 liters of dimethyl sulfoxide are heated to 110° C. and stirred under nitrogen. To this 3 grams of powdered potassium hydroxide is added and 367 grams of Nedox 1518 olefin oxide is gradually added. The mixture is stirred and heated at 110° to 120° C. for 16 hours. The product is then vacuum stripped of chemical solvents and volatiles.

EXAMPLE 5

164 grams of mannitan and 1,500 milliters of dimethyl formamide are stirred and heated to 120° C. Then 2 grams of sodium hydroxide are added and 245 grams of Nedox 1518 olefin oxide is gradually added to the above. The mixture is then heated to 140° C. and maintained at this temperature until the epoxide number (grams of product equivalent to 1 mol of free epoxide) is above 30,000. The mixture is then vacuum distilled to remove the solvent.

EXAMPLE 6

164 grams of 2,5-bis hydroxymethytetrahydrofuran is stirred with 1000 milliliters of pyridine and the mixture is heated to reflux under a nitrogen blanket. To this is added 189 grams of Nedox 1114 olefin oxide dropwise and refluxing is continued until the epoxide number is above 30,000. The product is vacuum distilled to remove the solvent.

EXAMPLE 7

100 grams of anhydrized A-Polyol of Example D with a hydroxyl number of 1053 is dissolved in 100 milliliters of dioxane. The solution is heated to 95° C. and 2 milliliters of boron trifluoride etherate is added as catalyst. Then 132 grams of Nedox 1114 is added dropwise over an hour period while the temperature is maintained at 95° to 110° C. After the addition is completed, the reaction mixture is stirred at 108° to 110° C. for an additional 2 hours. The product is stripped of solvent to leave a residue of 229 grams of a homogeneous red brown liquid. The hydroxyl number is 410. Partition of the product between ethylacetate and aqueous sodium sulfate shows only 15.8 percent free polyol present.

EXAMPLE 8

Per the procedure of Example 7, 170 grams of Nedox 1518 are reacted with 100 grams of A-Polyol anhydride of Example D. The product is 273 grams of a homogeneous waxy solid whose hydroxyl number is 380. Its epoxide equivalent is infinity. Partition of this product shows only 13.6% free polyol present.

EXAMPLE 9

Per the procedure of Example 7, 191 grams of stearyl glycidyl ether is reacted with 100 grams of A-Polyol anhydride of Example E. The product is a homogeneous waxy solid, whose hydroxyl number is 325 and whose epoxide equivalent is infinity. Partition of the product shows only 10% free polyol present.

EXAMPLE 10

662 grams of polyoxyethylene(10)sorbitan are reacted per Example 6 with 367 grams Nedox 1518 olefin oxide. The product is then vacuum stripped to remove solvents and volatiles.

EXAMPLE 11

1246 grams of polyoxypropylene(20)mannitan are reacted per the procedure of Example 5 with 1 mol of dodecylphenyl glycidyl ether over a 5 hour period at a temperature of approximately 160° C. The resultant product is vacuum distilled to remove the solvent.

EXAMPLE 12

170 grams of Nedox 1518 are reacted, in accordance with Example 7, with 100 grams of A-Polyol of Example B. The resultant Nedox 1518 ether of A-Polyol corn starch hydrolyzate is then mixed with 130 grams of the ether product of Example 10 resulting in a final composition containing 43.5 weight percent of Nedox 1518 ether of polyoxyethylene(10)sorbitan and 56.5 weight percent of Nedox 1518 ether of A-Polyol of corn starch hydrolyzate.

EXAMPLE 13

200 grams of tridecyl glycidyl ether are reacted with a 20–80 weight percent mixture of erythritol and sorbitan respectively according to the procedure of Example 7. The product is a mixture of tridecyl oxy($\beta$-hydroxypropyl) ether of sorbitan tridecyl oxy($\beta$-hydroxypropyl) ether of erythritol, tridecyl oxy($\gamma$-hydroxymethyl ethyl) ether of sorbitan and tridecyl oxy($\gamma$-hydroxymethyl ethyl) ether of erythritol.

The epoxide-alcohol ethers of this invention have been found to be excellent surfactant compositions. In particular they have been shown to be more resistant to acid and alkali solutions than organic ester type surfactants heretofore used. They can be used as antifoaming agents, emulsifiers and dispersants, the exact utility being dependent upon the relation of the hydrophobic and hydrophilic groups present in the final product. Thus said ethers can be used instead of and replace the heretofore used ester products such as sorbitan stearate acid ester, polyoxyethylene(10)sorbitan trioleate acid ester, and polyoxyethylene(20)sorbitol oleate acid ester.

The calculation of the surface active properties of these ethers may be performed according to the HLB system as described in an article by Mr. W. C. Griffin - *Classification of Surface Active Agents by HLB* Journal of the Society of Cosmetic Chemists, Volume 1, No. 5, pages 311 to 326, December, 1949. As explained in that article the length of the hydrophilic and hydrophobic moieties of a surface active agent determines its properties.

If the 2 hydroxytetradecyl ether of sorbitan, the HLB of which is about 8, and the 2 hydroxytetradecyl ether of polyoxyethylene(20)sorbitan the HLB of which is about 16 are properly blended they will yield an oil in water emulsifier. Thus, to emulsify aromatic mineral oil in water a composite HLB of about 12 is needed; this can be achieved by blending about 55 parts of the polyoxyethylene sorbitan ether to about 45 parts of the sorbitan ether. To prepare the emulsion, 5 weight percent of the above blend of surface active compounds based on the oil, are added to the oil at room temperature. The water is blended in at room temperature also, in a ratio of 4 parts water to 1 part oil. The result is an oil-in-water emulsion.

Having thus described the invention the following are claimed:

We claim:

1. A composition consisting essentially of a mixture of a fatty ether represented by the formula 1. $[R - X - R_2 - O]_y - R_3$ and a fatty ether represented by the formula
    2. $[R - X - R_2 - O]_y - R_1$ wherein R is a radical selected from the group consisting of alkyl, alkenyl, alkaryl, and alkenaryl; y is a number from 1–4; X is selected from the group consisting of sulfur, oxygen, and methylene; $R_2$ is selected from a group of radicals represented by the formulae:

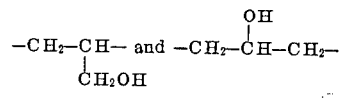

$R_3$ is a radical which remains when y hydroxyl groups are removed from a polyhydric alcohol anhydride containing at least one hydroxyl group and at least four carbon atoms; $R_1$ is a radical which remains when y hydroxyl groups are removed from a polyhydric alcohol which contains at least three hydroxyl groups and at least three carbon atoms; and $R - X - R_2 -$ contains a saturated or ethylenically unsaturated aliphatic hydrocarbon chain of at least eight carbon atoms; wherein said composition contains at least 10 weight percent of a fatty ether represented by formula (1) and wherein said fatty ethers derived from polyhydric alcohols containing three carbon atoms are no more than 10 weight percent of said composition.

2. A composition of claim 1 wherein said $R_3$ is a radical which remains after from one to four hydroxyl groups are removed from an anhydride of a polyhydric alcohol selected from the group consisting of hexitol, alkanetriols, alkanetetrols, alkanepentols, and oxyalkylene derivatives thereof containing from one to 30 oxyalkylene units.

3. A composition of claim 1 wherein the alkyl or alkenyl moiety represented by the radical $R - X - R_2 -$ is from 10 to about 25 carbon atoms long.

4. A composition of claim 1 wherein $R_1$ and $R_3$ are derived from a distillation fraction of a hydrogenolytic product of sugar, starch or a mixture of sugar and starch, wherein said distillation fraction is comprised of polyhydric alcohols and their anhydrides which boil at or above the boiling point of glycerin or an anhydrized product of said distillation product wherein up to 2 mols of water per mol of polyhydric alcohol has been removed.

5. A composition of claim 4 wherein the alkyl or alkenyl moiety contains from 10 to 25 carbon atoms.

6. A composition of claim 1 wherein X is either oxygen or a methylene radical, $R - X - R_2$ contains an alkyl or alkenyl group of from 10 to 25 carbon atoms, said polyhydric alcohols are selected from the group consisting of alkanetriols, alkanetetrols, alkanepentols, hexitols, mixtures thereof and oxyalkylene derivatives thereof containing from one to 30 oxyalkylene units, and said polyhydric alcohol anhydrides are selected from anhydrized alkanetriols alkanetetrols, alkanepentols, hexitols, mixtures thereof and oxyalkylene derivatives thereof containing from one to 30 oxyalkylene units.

7. A process for the production of the composition of claim 1 which comprises reacting an epoxide containing a saturated or ethylenically unsaturated hydrocarbon chain of at least eight carbon atoms and represented by the formula
    $$R - X - R_4$$
    wherein R and X are as defined in claim 1 and $R_4$ is a oxyranylmethyl radical, with a mixture of an anhydrized polyhydric alcohol containing at least four carbon atoms and at least one hydroxyl group and non-anhydrized polyhydric alcohols containing at least three hydroxy groups and at least three carbon atoms and oxyalkylene derivatives thereof containing one to 30 oxyalkylene units, in the presence of an epoxide addition catalyst and a mutual solvent, and in a ratio to provide from about one to about six mols of epoxide per mol of polyhydric alcohol.

8. A process according to claim 7 wherein the anhydrized polyhydric alcohol is the anhydrized product of a polyhydric alcohol selected from the group consisting of hexitan, pentitan, alkanetriols, alkanetetrols, alkanepentols, and oxyalkylene derivatives thereof containing from one to 30 polyoxylakylene units and wherein the non-anhydrized polyhydric alcohol is selected from the group consisting of alkanetriols, alkanetetrols, alkanepentols, hexitols and oxyalkylene derivatives thereof containing from one to 30 oxyalkylene units.

9. A process according to claim 8 wherein the radical R— X — of said epoxide contains an ethylenically unsaturated or saturated hydrocarbon chain of from 10 to 25 carbon atoms.

10. A process according to claim 7 wherein said epoxide contains a saturated or ethylenically unsaturated aliphatic hydrocarbon chain of from 10 to 25 carbon atoms and wherein said mixture is selected from the group consisting of (1) a distillation fraction of a hydrogenolytic product of sugar, starch or a mixture of starch and sugar, wherein said distillation fraction is comprised of polyhydric alcohols and their anhydrides which boil at or above the boiling point of glycerine and (2) an anhydrization product of said distillation product wherein up to two mols of water per mol of polyhydric alcohol has been removed.

* * * * *